United States Patent [19]
Bowser et al.

[11] 3,919,023
[45] Nov. 11, 1975

[54] MULTIPLE GLAZED UNIT

[75] Inventors: George H. Bowser, New Kensington; Renato J. Mazzoni, Tarentum, both of Pa.

[73] Assignee: PPG Industries, Inc., Pittsburgh, Pa.

[22] Filed: Sept. 24, 1973

[21] Appl. No.: 400,111

[52] U.S. Cl. ............ 156/107; 52/172; 52/232; 52/616; 156/109; 428/34
[51] Int. Cl.² ... B32B 17/00; B32B 3/02; E06B 3/24
[58] Field of Search ........ 161/43, 45; 156/107, 109; 52/172, 616, 232, 400

[56] References Cited
UNITED STATES PATENTS

| | | | |
|---|---|---|---|
| 2,684,266 | 7/1954 | Engelhart | 52/232 X |
| 2,838,809 | 6/1958 | Zeolla et al. | 52/172 |
| 2,974,377 | 3/1961 | Kunkle | 52/172 X |
| 3,573,149 | 3/1971 | Tibble et al. | 52/616 X |
| 3,733,237 | 5/1973 | Wolff | 52/172 X |
| 3,758,996 | 9/1973 | Bowser | 52/172 |
| 3,791,910 | 2/1974 | Bowser | 156/109 |

*Primary Examiner*—Philip Dier
*Attorney, Agent, or Firm*—Donald Carl Lepiane

[57] ABSTRACT

A multiple glazed unit which is economical to construct and has a high quality moisture-resistant barrier of increased length is disclosed. The moisture-resistant barrier prevents moisture in the atmosphere from moving into the interior air space and into contact with desiccant material. The desiccant material is used to absorb moisture from the air space. The unit includes a pair of glass sheets adhesively bonded with a moisture-resistant adhesive to a frame. The frame is made of sections of a lock seam spacer having the desiccant material therein and joined at their ends. The frame maintains the sheets in spaced relation and defines the air space between the sheets of glass. A composite strip having a moisture-resistant adhesive on one side of a bendable-formable tape is adhesively bonded to peripheral and marginal edges of the pair of glass sheets and to the peripheral edges of the frame.

4 Claims, 8 Drawing Figures

MULTIPLE GLAZED UNIT

CROSS REFERENCE TO RELATED APPLICATION

The method and apparatus of fabricating a multiple glazed unit as taught in U.S. patent application Ser. No. 400,112, filed even date in the name of George H. Bowser, Renato J. Mazzoni and Raymond G. Gallagher and entitled "Method of Fabricating a Multiple Glazed Unit" may be used to fabricate the multiple glazed unit of this invention and the description thereof in the application is hereby incorporated by reference.

BACKGROUND OF THE INVENTION

1. Field of the Invention

This invention relates to a multiple glazed unit that is economical to construct and has a high quality moisture-resistant barrier of increased length and to a method of making same.

2. Discussion of the Prior Art

Multiple glazed units generally comprise two or more sheets of glass spaced from one another to provide an insulating air space between the sheets. The sheets of glass are held in spaced relation by a spacer. The spacer generally has three functions, namely, (1) to maintain adjacent sheets in spaced relation, (2) to define an interior air space between the sheets and (3) to absorb moisture in the air space.

Generally, the usable life of a multiple glazed unit is a function of (1) the desiccant material of the spacer, (2) the quality of the moisture-resistant barrier and (3) the moisture-resistant capability of the barrier. More particularly, when the desiccant material is not capable of absorbing all of the moisture in the air space, the moisture condenses in the air space and detracts from the aesthetic appeal and usefulness of the multiple glazed unit.

The desiccant material of the spacer absorbs moisture in the air space which is trapped in the air space at the time the unit is fabricated. The desiccant material also absorbs moisture from the atmosphere moving through the moisture-resistant barrier. Moisture-resistant barrier, as used herein, prevents moisture in the atmosphere from moving into the air space or into contact with the desiccant material.

The moisture-resistant capability of the moisture-resistant barrier is a function of the moisture-resistance of the adhesive which normally forms the barrier in multiple glazed units, and the length of the moisture-resistant barrier. The quality of the barrier is dependent on the absence of voids in the adhesive. The voids in the adhesive do not resist the movement of moisture.

Although the prior art multiple glazed units are acceptable, it can be appreciated that providing a multiple glazed unit which is economical to fabricate and has a high quality moisture-resistant barrier of increased length is desirable.

In this regard, consider the following. Several types of multiple glazed units are disclosed in U.S. patent application Ser. No. 250,717, filed on May 5, 1972 now U.S. Pat. No. 3,758,996, in the name of G. H. Bowser and entitled "Multiple Glazed Unit". In FIGS. 2–9 of the above-mentioned U.S. patent application Ser. No. 250,717, the multiple glazed units are fabricated using an organic spacer-dehydrator element having various configurations. In general, the length of the moisture-resistant barrier of the multiple glazed units of FIGS. 2–9 of the above-identified U.S. patent application Ser. No. 250,717 is from the peripheral edge of the moisture-resistant adhesive exposed to the atmosphere to the surface of the spacer-dehydrator element adhered to the moisture-resistant adhesive. As will be appreciated, in comparison to the present invention, the length of the moisture-resistant barrier of the multiple glazed units of the above-identified U.S. patent application Ser. No. 250,717 is comparatively short. With a moisture-resistant barrier having a short length, the moisture has a higher probability of contacting the spacer-dehydrator element in a shorter time, thereby decreasing the usable life of the element. This is because the element absorbs moisture at the surfaces of the element in contact with the moisture-resistant adhesive and at the surface of the element facing the air space.

In FIG. 11 of the above-identified U.S. patent application Ser. No. 250,717, there is shown a multiple glazed unit having a perimeter spacer channel. Inserted within the spacer channel is a dehydrator element. Legs of the spacer channel are adhesively bonded to opposed marginal edge portions of the glass sheets by a moisture-resistant adhesive. Moisture-resistant adhesive is also provided over marginal and peripheral edge portions of the glass and over the web of the spacer channel. A channel member having essentially a U-shaped cross-section is superimposed over the peripheral and marginal edges of the glass sheets and extends completely around the perimeter of the unit to protect the edges of the glass sheets.

The length of the moisture-resistant barrier of the multiple glazed unit as shown in FIG. 11 of the above-identified U.S. patent application Ser. No. 250,717 is longer than the length of the moisture-resistant barrier of the multiple glazed units as shown in FIGS. 1–9 of the same application. However, the channel member is not easily formable and care has to be exercised to insure that there are no voids in the moisture-resistant barrier. For example, if one sheet of glass is shorter than the other sheet of glass, more quantity of moisture-resistant adhesive is required at the peripheral edge of the shorter glass sheet. If the edges of sheets of glass have chips or nicks, more quantity of moisture-resistant adhesive is required than for sheets having edges that are chip free. This is because the channel member is preformed to a desired size and shape and any variation in glass size or edge quality has to be compensated for by selectively increasing the quantity of the moisture-resistant adhesive. Further, because the channel member is preformed and generally made of steel, the channel members are expensive.

In U.S. Pat. No. 2,838,809, there is disclosed still another type of multiple glazed unit. The multiple glazed unit has a lock seam spacer containing a desiccant material. The spacer is adhesively bonded to opposed marginal edge portions of the pieces of glass by a vapor barrier material. Additional vapor barrier material is provided at the peripheral edges of the glass and of the lock seam spacer. The entire unit is surrounded by a pressure sensitive tape having a tape backing of an elastic water-impervious material. The tape acts as a barrier against the entrance of moisture within the unit due to condensation on the outer surfaces of the unit.

The length of the moisture-resistant barrier of the unit of the above-identified patent is from the peripheral edges of the glass sheets to the interior air space. Even though the tape backing is of a water-impervious material, and the tape prevents moisture from condensation from entering the unit, there is no provision for preventing moisture in the atmosphere from passing between the tape and the marginal edge portions of the glass sheets. Therefore, the length of the moisture-resistant barrier extends from the peripheral edge of the glass sheets to the air space.

SUMMARY OF THE INVENTION

This invention relates to a multiple glazed unit which is economical to construct and has a high quality moisture-resistant barrier of increased length. The unit includes a frame having a glass sheet adhesively bonded with a moisture-resistant adhesive to opposed sides of a frame. The frame includes sections of metal spacers, containing a desiccant material, joined at their ends as by welding to provide a hermetic seal at the joined ends of the sections of the spacers and to make the frame rigid. The pair of glass sheets adhesively bonded to the frame by the moisture-resistant adhesive form a subassembly having a primary moisture-resistant seal and having an interior air space between the sheets. A composite strip having a layer of moisture-resistant adhesive adhered to one side of a bendable-formable tape completely surrounds the subassembly. More particularly, portions of the layer of moisture-resistant adhesive of the composite strip intermediate the edges of the strip are adhesively bonded to the peripheral edges of the glass sheets and the peripheral edge of the frame and portions of the adhesive on either side of the intermediate portion are adhesively bonded to the marginal edge portions of the glass sheets.

This invention also relates to a method of fabricating the multiple glazed unit of this invention.

In the unit to be described in this invention, the length of the moisture-resistant barrier is from the peripheral edge of the composite strip to the air space. In the unit of this invention, the glass sheets need not be of exact dimensions nor have edges free of chips because the composite strip has a bendable-formable tape which is urged against the peripheral edges of the glass sheets to assure that the moisture-resistant adhesive is in adhesive bonding contact with all peripheral edge surfaces of the glass sheets. Further, the multiple glazed unit of this invention is economical to fabricate because the bendable-formable tape is less expensive than the preformed metal channel members of the prior art.

DESCRIPTION OF THE INVENTION

This invention relates to an inexpensive multiple glazed unit having a high quality moisture-resistant barrier of increased length and to a method of making same. The moisture-resistant barrier prevents moisture in the atmosphere from entering the interior air space or from contacting the desiccant material. The desiccant material absorbs moisture from the interior air space.

Figure 1:
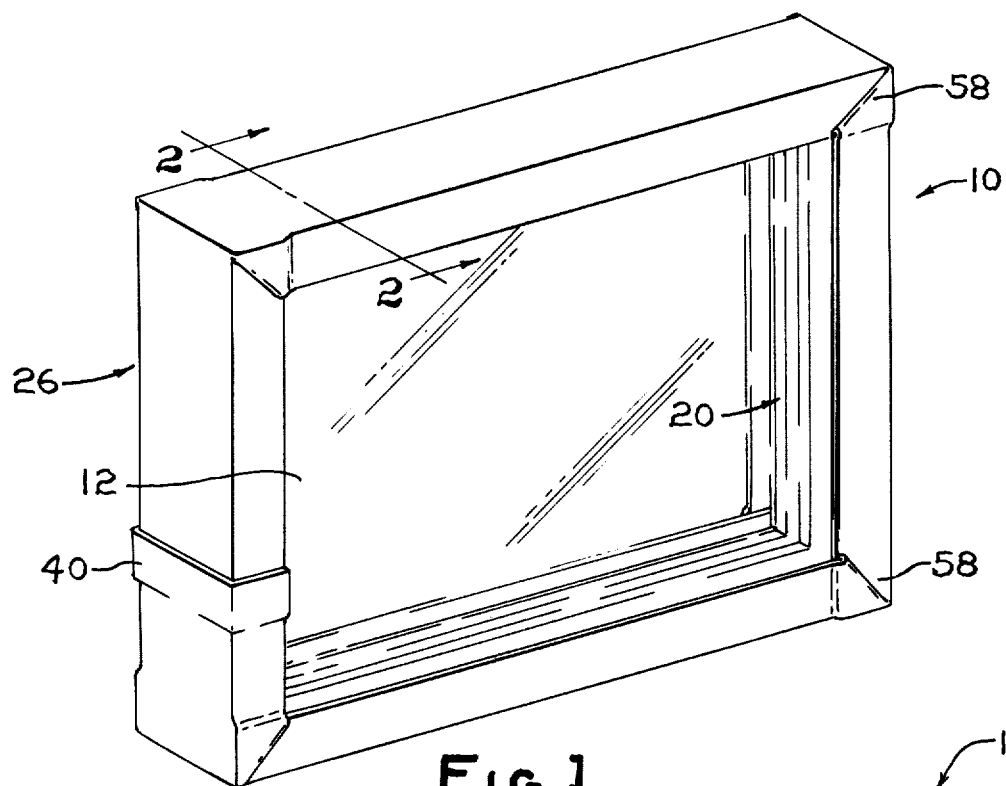
FIG. 1 is an isometric view of a multiple glazed unit embodying the principles of the invention.
Figure 2:
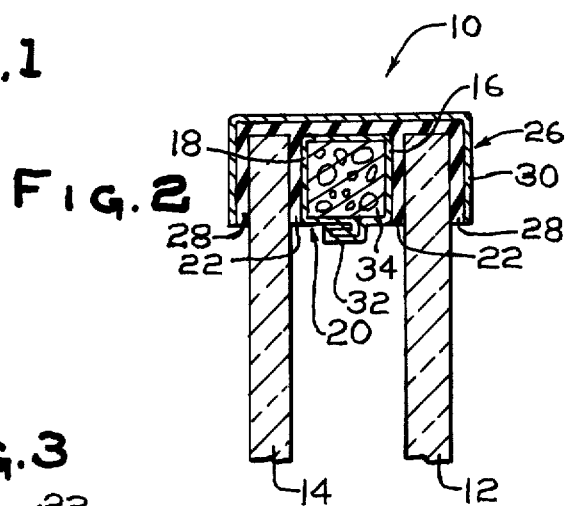
FIG. 2 is a cross-sectional view of FIG. 1 taken along lines 2—2 of FIG. 1 illustrating a preferred type of spacer to be used in the practice of the invention.

With reference to FIGS. 1 and 2, there is shown the preferred embodiment of a multiple glazed unit 10 embodying principles of this invention. In general, the multiple glazed unit 10 includes glass sheets 12 and 14 adhesively bonded to opposed outer surfaces 16 and 18 of a frame 20 by a layer of moisture-resistant adhesive 22 to provide a subassembly 24 having a primary moisture-resistant seal (see also FIG. 5). A composite strip 26 having a layer of moisture-resistant adhesive 28 on one side of a bendable-formable tape 30 (shown better in FIG. 2) completely surrounds the multiple glazed unit 10. Portions of the strip 26 are adhesively bonded to (1) peripheral and marginal edges of the glass sheets 12 and 14 and (2) peripheral edges of the frame 20 to provide a secondary moisture-resistant seal. As will become readily apparent and for purposes of this invention, the primary seal, the secondary seal and the frame form the moisture-resistant barrier.

The sheets of glass 12 and 14 generally each have the same configuration and dimensions; however, as will be discussed below in more detail, the sheets of glass need not be exactly the same dimensions nor need they have smooth edges, e.g. free of chips.

Although the discussion of the invention will be directed to multiple glazed units having transparent sheets of glass, as will be appreciated by those skilled in the art, the invention is not limited thereto. For example, rigid sheets of any transparent material such as transparent plastic may be used in the practice of the invention.

Figure 3:
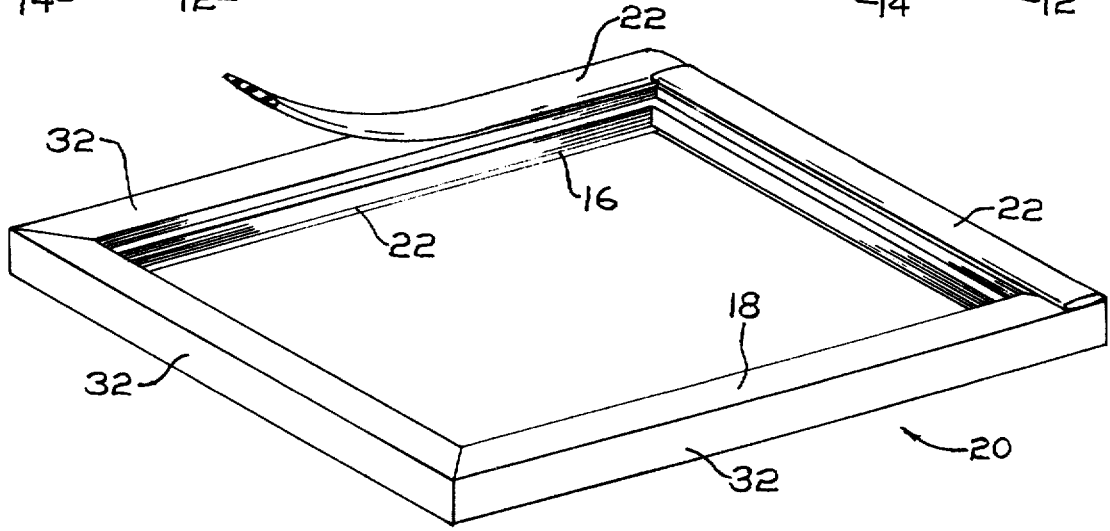
FIG. 3 is an isometric view of a frame used in the practice of the invention illustrating a layer of moisture-resistant adhesive being applied to the frame.

With reference to FIG. 3, the frame 20 includes sections of a spacer 32 containing desiccant material 34 joined at their ends to make the frame rigid (shown in FIG. 2). The joined ends of the sections of the spacer are hermetically sealed, as by welding, to prevent the ingress of moisture at the joined ends.

Figure 4:
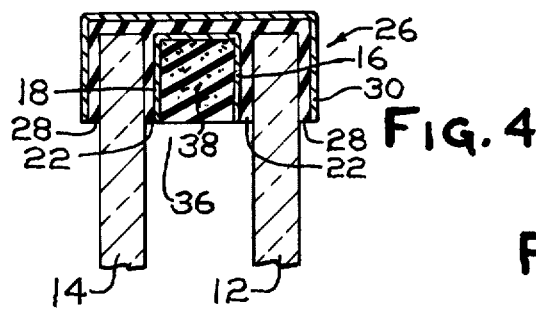
FIG. 4 is a partial cross-sectional view of a multiple glazed unit illustrating an alternate type of spacer that may be used in the practice of the invention.

The spacer 32 may be of the lock seam type (see FIG. 2) described in U.S. Pat. No. 2,684,266 which description is hereby incorporated by reference or of a spacer channel type 36 (see FIG. 4) similar to the type described in U.S. patent application Ser. No. 250,717, filed on May 5, 1972, in the name of George H. Bowser and entitled "Multiple Glazed Unit" now U.S. Pat. No. 3,758,996 which description is hereby incorporated by reference. As will be appreciated by those skilled in the art, the invention is not limited to the type or configuration of the spacer. However, it is recommended that the spacer be made of moisture-impervious material such as metal and that it extends from between the glass sheets to the peripheral edge of the glass sheets, as shown in FIGS. 2 and 4. In this manner, moisture in the atmosphere must pass through the primary and secondary seal into the air space to contact the desiccant material in the spacer.

The desiccant material 34 used in the practice of the invention may be any of the well known types such as silica gel or molecular sieve or the desiccant may be a dehydrator element 38 (see FIG. 4) such as the type disclosed in the above-mentioned U.S. patent application Ser. No. 250,717. In regards to FIG. 4, it is recommended that the dehydrator element 38 be secured in the spacer channel 36, as by adhesive, to prevent the element from falling out of the channel 36. As will be appreciated, the invention is not limited to the type of desiccant material used in the spacer to absorb moisture from the air space between the sheets of glass 12 and 14.

The layer of moisture-resistant adhesive 22 on opposed outer surfaces 16 and 18 of the frame 20 adhesively bonds opposed outer surfaces 16 and 18 of the frame 20 to opposed marginal edge portions of the sheets of glass 12 and 14 to form the primary moisture-resistant seal (see FIGS. 2 and 4).

The moisture-resistant adhesive which may be used within the contemplation of this invention, but not limited thereto, are materials that are capable of cold flow at room temperature and include precured materials such as disclosed in U.S. Pat. No. 2,974,377 which description thereof is hereby incorporated by reference, as well as room temperature-curable materials such as disclosed in U.S. patent application Ser. No. 232,411, filed on Mar. 7, 1972 now U.S. Pat. No. 3,791,910, in the name of George H. Bowser and entitled "Multiple Glazed Unit" which description thereof is hereby incorporated by reference. Room temperature-curable materials that cold flow to form a seal and cure to form a resilient structure bond are particularly desirable for use in the construction of the multiple glazed unit of this invention.

With reference to FIGS. 1, 2, 4 and 5, the carrier tape 30 of the composite strip 26 may be composed of any bendable-formable material that is moisture-impervious. Normally, the carrier tape 30 is a strip of 7–9 mil aluminum foil. The width of the tape 30 is sufficient to span the marginal and peripheral edge portions of each sheet of glass 12 and 14 (see FIGS. 2 and 4). The length of the tape should be sufficient to completely surround the perimeter of the glazed unit with ends of the tape overlapping as shown at 40 in FIG. 1.

A continuous layer of moisture-resistant adhesive 28 is provided on one side of the tape 30. As will be appreciated, since the adhesive 28 is flowed to form the secondary moisture-resistant seal, it is recommended that side portions of the layer of the adhesive 28 be spaced from the sides of the tape 30. This is to prevent the unsightly appearance of adhesive beyond the sides of the tape after the secondary seal is formed. The discussion of the moisture-resistant adhesive 22 on the frame 20 is applicable to the moisture-resistant adhesive 28 of the composite strip 26. However, as can be appreciated, the adhesive 22 and 28 may be similar or dissimilar.

Figure 5:
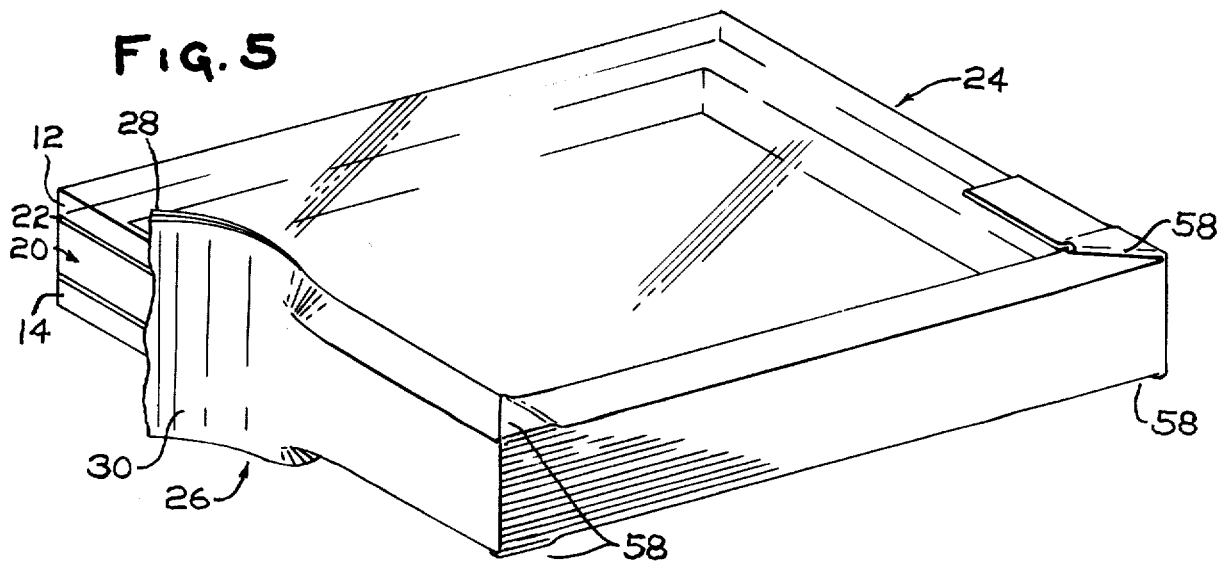
FIG. 5 is an isometric view of the multiple glazed subassembly embodying principles of the invention showing the application of a composite strip to the peripheral and marginal edges of the subassembly.

With reference to FIG. 5, a portion of the composite strip 26 intermediate its edges is superimposed and adhesively bonded to (1) the peripheral edges of the sheets of glass 12 and 14; (2) the adhesive 22 and (3) the peripheral edges of the frame 20 as shown in FIGS. 2 and 4. As can be appreciated, since the spacer is made of moisture-impervious material, moisture in the atmosphere passing through the secondary moisture-resistant seal cannot contact the desiccant material 34 or 38 of the spacer 32 or 36, respectively, until it passes through the primary moisture-resistant seal.

The discussion will now be directed to general procedural steps for assembling a multiple glazed unit according to this invention. A pair of glass sheets 12 and 14 are provided having a desired shape and size. The sheets are cleaned in any well-known manner to (1) clean the surfaces of the sheets of glass facing the air space and (2) to provide a clean surface for adhesion of the moisture-resistant adhesive 22 and 28 which form the primary and secondary moisture-resistant seals, respectively.

With reference to FIG. 3, the frame 20 is formed of sections of a spacer 32 or 36 containing a desiccant material 34 or 38, respectively (shown in FIGS. 2 and 4, respectively). The frame 20 may be formed by providing sections of a spacer having mitered ends and joining the ends of the sections to form the frame. The general configuration of the frame 20 is similar to the sheets of glass and has outside dimensions similar to corresponding dimensions of the sheets of glass. Alternately, the frame may be formed by providing a section of a spacer and mitering portions of the spacer along its length to permit bending of the spacer to form the frame. The joined ends of the spacers are preferably hermetically sealed in any conventional manner as by welding. It is recommended that any high spots at the corners of the frame be removed to eliminate any undue stresses from being applied at the corners of the multiple glazed unit. The joined corners of the frame are hermetically sealed so that moisture has to travel through the primary seal and secondary seal to contact the desiccant material. In this manner, the multiple glazed unit of this invention is provided with a moisture-resistant barrier of increased length.

With reference to FIG. 3, a layer of moisture-resistant adhesive 22 is applied to the opposed outer surfaces 16 and 18 of the frame 20 (see also FIGS. 2 and 4). The adhesive 22 may be applied to the opposed outer surfaces 16 and 18 of the frame 20 in any conventional manner as by extruding. It is recommended that the layer of the adhesive 22 be spaced from the sides of the opposed outer surfaces of the frame. This is to prevent the adhesive 22 which is flowed to form the primary seal from extending beyond the spacer into the air space which makes the multiple glazed unit unsightly.

Figure 6:
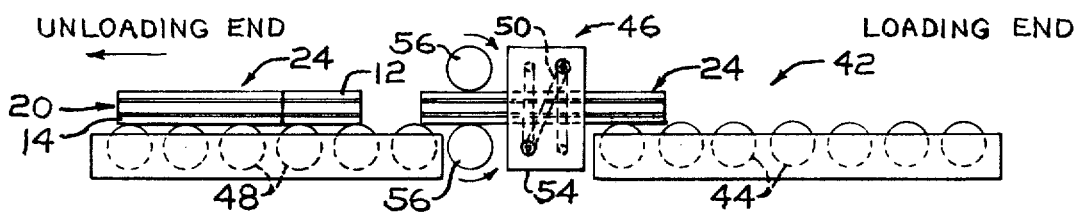
FIG. 6 is a side view of an apparatus that may be employed to adhesively bond a pair of glass sheets to the frame of FIG. 4 to form the multiple glazed subassembly having a primary moisture-resistant seal.

The next preferred step is to support a sheet of glass, e.g. sheet 12, on a rigid surface, positioning the frame 20 having the adhesive 22 on the sheet of glass 12 and thereafter positioning the second sheet, e.g. sheet 14, on top of the frame having the adhesive 22 to form a subassembly 24 (see also FIGS. 5 and 6).

The primary moisture-resistant seal may be formed by applying sufficient pressure to each side of the subassembly 24 to flow the adhesive 22. For the moisture-resistant adhesive described in the above-mentioned U.S. patent application Ser. No. 232,411 now U.S. Pat. No. 3,791,910, and in connection with this invention, static pressure loads of about 3–12 psi applied for 24 hours have been found to be sufficient to flow the adhesive 22 to form the primary seal. In the alternative, the subassembly 24 may be heated and pressure subsequently applied to flow out the adhesive 22 with pressure loads of about 1–5 psi to form the primary seal.

Heat may be applied to the subassembly 24 to flow out the adhesive in any conventional manner as by resistance heating, induction heating, dielectric heating or microwave heating.

Figure 7:
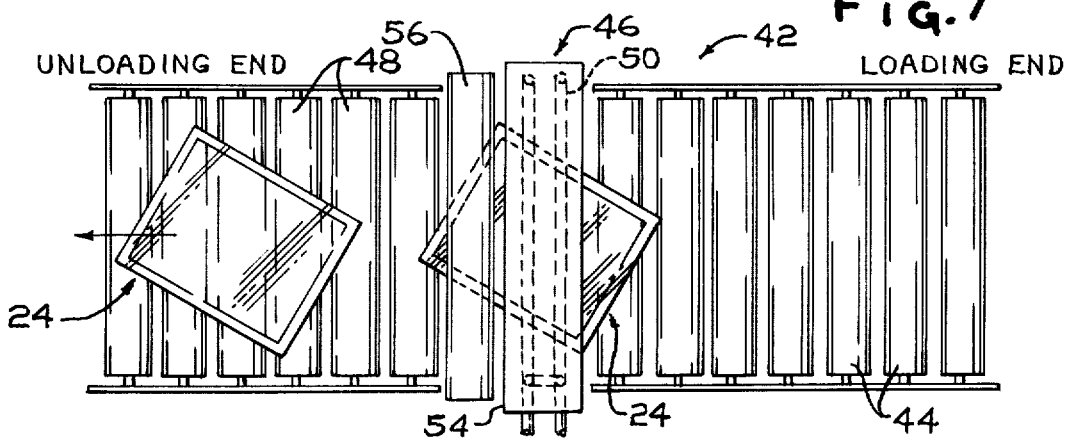
FIG. 7 is a plan view of the apparatus shown in FIG. 6.

With reference to FIGS. 6 and 7, there is shown an apparatus 42 disclosed in the above-mentioned U.S.

patent application Ser. No. 400,112 filed even date, that has proven satisfactory to provide the subassembly 24 with a primary moisture-resistant seal.

The apparatus 42 includes a conveyor having rollers 44 operated in any conventional manner to move the subassembly 24 from a loading end through a heating and pressing station 46 and a second conveyor having rollers 48 operated in any conventional manner to move the subassembly 24 from the heating and pressing station 46 to an unloading end.

Figure 8:
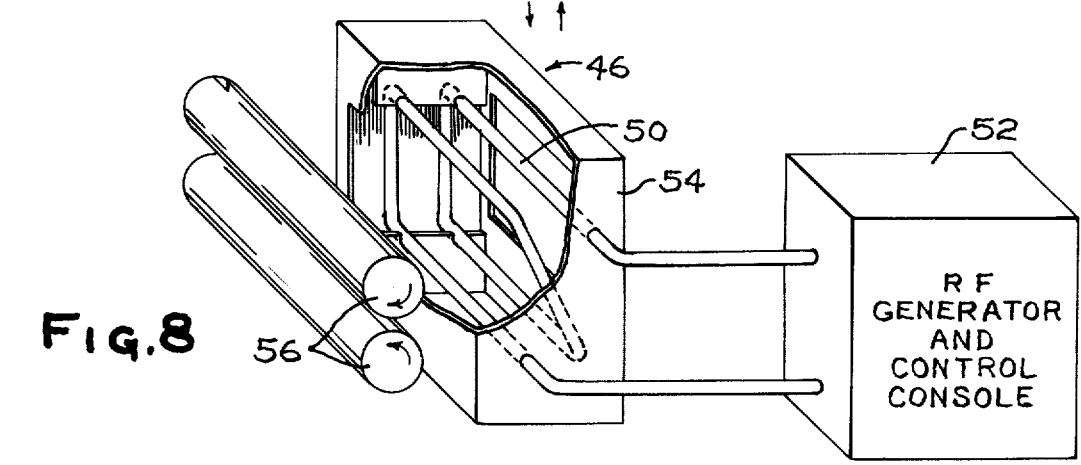
FIG. 8 is an isometric view of the heating and pressing station of the apparatus of FIGS. 6 and 7 and having portions cut away for purposes of clarity.

With reference to FIG. 8, the heating and pressing station 46 includes induction coils 50 connected to an RF Generator and control console 52. For reasons of safety, the coils 50 are mounted in a housing 54 made of non-conductive material and the coils are covered with an insulating material (not shown).

Positioned adjacent the coils 50 and downstream thereof is a pair of nipper rollers 56. The nipper rollers 56 are operated in any conventional manner to urge the sheets of glass against the adhesive 22 on the frame 20 to flow the heat-softened adhesive to form the primary seal. Preferably the nipper rollers are made of rubber to prevent arcing of the coils 50 and to prevent marring of the glass surface.

It is recommended that the conveyors 44 and 48 and the nipper rollers 56 rotate at the same speed so that the subassembly will not be jerked which could cause the sheets of glass and frame to become misaligned with respect to each other.

As the subassembly 24 is incrementally displaced by the rollers 44 from the loading end, it passes through the coils 50 which heat the frame 20. The heated frame heats the adhesive 22 by conduction to soften the adhesive. Thereafter the subassembly passes through the nipper rollers 56 which flow the heat-softened adhesive 22 between the marginal edge portions of opposed surfaces of the sheets of glass and opposed outer surfaces 16 and 18 of the frame 20. The subassembly 24, as it is incrementally moved through the heating and pressing station 46, is incrementally moved by rollers 48 to the unloading end. When the adhesive 22 cools, the primary moisture-resistant seal is formed.

With reference to FIGS. 6 and 7, it will be noted that the leading edge of the subassembly 24 is a corner and not a side. This is to prevent the nipper rollers from misaligning the glass sheets relative to the frame. However, as can be appreciated, the invention is not limited to the position of the subassembly as it is moved through the heating and pressing station 46.

The next preferred step is the application of the composite strip 26 to the subassembly 24 having the primary seal. With reference to FIG. 5, a length of the composite strip 26 is applied to the subassembly 24 such that a portion of the adhesive 28 intermediate the sides of the tape 30 is adhesively bonded to the peripheral edges of the sheets of glass 12 and 14 and the peripheral edges of the frame 20 (see also FIGS. 2 and 4). The outer portions of the strip 26 are bent over marginal edge portions of the sheets of glass such that the portions of the adhesive on each side of the intermediate portion are adhesively bonded to the marginal edge portions of the glass sheets. Because the composite strip 26 is provided with a bendable-formable carrier tape 30, differences in dimension between the glass sheet or chips at the edges of the glass sheets do not prevent the forming of a good secondary moisture-resistant seal. This is because the strip is easily formed so as to press the adhesive 28 against the peripheral edges of the glass sheet and in adhesive contact with the primary seal. Forming the secondary moisture-resistant seal with the composite strip 26 makes the multiple glazed unit of this invention more economical than the prior art units using a preformed metal channel such as the type disclosed in the above-mentioned U.S. patent application Ser. No. 250,717. This is because the composite tape 26 is not pre-formed, and is made of less expensive material, e.g. 7-9 mil aluminum foil.

At the corners it is preferred not to miter the composite strip but to overlap the composite strip as shown at 58 in FIGS. 1 and 5 to insure a good secondary seal.

As can be appreciated, the invention is not limited to the device used to apply the composite strip 26. Any known device may be used such as the one disclosed in U.S. Pat. No. 3,733,237 and the description thereof is hereby incorporated by reference.

DETAILED DESCRIPTION OF THE INVENTION

A specific embodiment of a multiple glazed unit of this invention will now be presented for purposes of illustration with the understanding that the invention is not limited thereto. The apparatus used to provide the subassembly 24 with a primary moisture-resistant seal is of the type disclosed in the above-mentioned U.S. patent application Ser. No. 400,112 filed even date.

With reference to FIG. 3, four (4) sections of lock seam spacers 32 having desiccant material 28 are provided. The lock seam spacers are of the type disclosed in U.S. Pat. No. 2,684,266. The spacers have a height of ¼ inch, i.e., the distance between opposed outer surfaces 16 and 18 of the frame 20, and a width of 5/16 inch. Two (2) spacers are 14 inches in length and the other two (2) are 20 inches in length. The ends of the spacers are mitered and joined by welding to provide a frame 20 that is 14 × 20 inches. The welded corners are ground to eliminate high spots that can cause undue stress at the corners of the glazed unit. A layer of moisture-resistant adhesive 22 of the type disclosed in U.S. patent application Ser. No. 232,411 having a thickness of about 15 to 20 mils and a width of less than about 5/16 inch is extruded onto opposed outer surfaces 16 and 18 of the frame 20.

A pair of glass sheets 12 and 14 approximately 14 × 20 inches and ⅛ inch thick are cleaned in any conventional manner. The frame 20 with the layer of the adhesive 22 is positioned between the sheets of glass to provide a subassembly 24. With reference to FIGS. 6 and 7, the subassembly is loaded onto rollers 44 at the loading end of the apparatus 42. The subassembly 24 is positioned on the rollers 44 such that a corner of the subassembly 24 is the leading end (see FIG. 7). The rollers 44 move the subassembly from the loading end to a heating and pressing station 46 of the apparatus at a speed of about 6 ft./min. The subassembly 24 moves through an induction coil 50 of the heating and pressing station 46. The coil 50 has a center opening having a height of 1¼ inches, a length of 7 feet and a width of 1¼ inches. As the subassembly 24 moves through the coil, the frame 20 is heated which softens the adhesive 22 by conduction.

The coil 50 is connected to an RF Generator 52 such as the type sold by Westinghouse Corporation and having a 10KW output. The RF Generator is operated to heat the frame 20 such that the adhesive 22 is heated by conduction to a temperature of about 160°–180°F.

As the subassembly 24 is incrementally moved through the coil 50, the leading end of the subassembly passes between a pair of nipper rollers 56 spaced about 0.524 inch apart. The center-to-center spacing between the coil 50 and nipper rollers 56 is about 8 inches.

The nipper rollers which are 8 inches in diameter are made of rubber having a durometer Shore A reading of 50. The nipper rollers are rotated at a speed of about 6 ft./min. and apply pressure of about 3–5 psi to flow the heat-softened adhesive 22 between the opposed surfaces 16 and 18 of the frame 20 and opposed marginal edge portions of the sheets of glass 12 and 14, respectively.

The leading edge of the subassembly passes through the nipper rollers onto rollers 48 spaced as close as possible to the nipper rollers. The rollers 48 move the subassembly 24 away from the heating and pressing station 46 at a speed of about 6 ft./min. to an unloading end of the apparatus. As the subassembly moves toward the unloading end, the adhesive 22 cools to form a primary moisture-resistant seal.

With reference to FIG. 5, a composite strip 26, 69 inches in length and 1 inch in width is provided. The composite strip has an 8-mil thick aluminum tape 30 and a layer of adhesive 28. The adhesive 28 which is adhered to one side of the tape is about 20 mils thick and ¾ inch wide. The adhesive 28 is similar to the adhesive 22 on the frame 20.

An end of the strip 26 is preferably applied between two adjacent corners of the subassembly 24 having the primary seal. The strip 26 is applied to the subassembly such that the intermediate portion of the tape is superimposed over the peripheral edge of the subassembly. The tape is incrementally applied to the subassembly as by a pressing device (not shown) such as the type disclosed in U.S. Pat. No. 3,733,237. The pressing device (1) flows a portion of the tape intermediate the edges into adhesive bonding contact with the peripheral edge of the subassembly while (2) folding and pressing portions of the tape on either side of the intermediate portion over the marginal edge portions of the sheets of glass to form a secondary moisture-resistant seal. At the corners of the subassembly the outer portions of the tape overlap, as at 58 in FIGS. 1 and 5. Further, the end of the strip overlaps the starting end of the composite strip 26 as shown at 40 in FIG. 1.

As can be appreciated by those skilled in the art, the fabrication of the multiple glazed unit of this invention is not limited to the sequence of procedural steps as presented.

The multiple glazed unit of this invention is inexpensive to construct and has a high quality moisture-resistant barrier of increased length.

What is claimed is:

1. A method of fabricating a multiple glazed unit having an interior airspace, comprising the steps of:
    providing a spacer frame (1) having a desiccant material therein and (2) having the surfaces of the frame facing the interior of the airspace penetrable by moisture and the remaining surfaces of the frame moisture impervious;
    providing a layer of moisture-resistant adhesive on opposed outer surfaces of the frame;
    positioning a sheet of a rigid material on each side of the frame with the marginal edge portions of the sheets in contact with the moisture-resistant adhesive on the frame;
    flowing the moisture-resistant adhesive between the opposed surfaces of the frame and adjacent marginal edge portions of the sheets to form a subassembly having a primary moisture-resistant seal;
    providing a composite strip including a moisture-impervious, bendable-formable tape with a layer of moisture-resistant adhesive on one surface of the tape; and
    applying the composite strip to the subassembly with (1) a portion of the adhesive of the strip intermediate the sides in adhesive contact with the peripheral edge portions of the sheets, spacer frame and adhesive of the primary seal and (2) portions of the adhesive on each side of the intermediate portion extending to and in adhesive contact with outer marginal edges of the rigid sheets.

2. The method as set forth in claim 1, wherein the subassembly has a polygon shape and including the step of overlapping portions of the composite strip at corners of the subassembly.

3. The method as set forth in claim 1, wherein said step of providing a spacer frame includes the steps of:
    providing sections of a spacer containing desiccant material;
    mitering the ends of each section of the spacer; and
    joining the ends of the spacer sections to form the frame with the joined ends of the spacer sections hermetically sealed.

4. The method as set forth in claim 1 wherein the sheets are glass sheets.

* * * * *